(12) United States Patent
Jinno

(10) Patent No.: US 11,659,283 B2
(45) Date of Patent: May 23, 2023

(54) APPARATUS, METHOD, AND STORAGE MEDIUM

(71) Applicant: CANON KABUSHIKI KAISHA, Tokyo (JP)

(72) Inventor: Takayuki Jinno, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/475,900

(22) Filed: Sep. 15, 2021

(65) Prior Publication Data

US 2022/0103735 A1 Mar. 31, 2022

(30) Foreign Application Priority Data

Sep. 28, 2020 (JP) .............. JP2020-161942

(51) Int. Cl.
*H04N 23/71* (2023.01)
*H04N 23/74* (2023.01)
(52) U.S. Cl.
CPC ............. *H04N 23/71* (2023.01); *H04N 23/74* (2023.01)

(58) Field of Classification Search
CPC .... H04N 5/2351; H04N 5/2354; H04N 23/71; H04N 23/74
See application file for complete search history.

(56) References Cited

U.S. PATENT DOCUMENTS 10,353,070 B2 * 7/2019 Sugimoto ............... G06T 7/521

FOREIGN PATENT DOCUMENTS

JP 2007219715 A 8/2007

* cited by examiner

*Primary Examiner* — Twyler L Haskins
*Assistant Examiner* — Angel L Garces-Rivera
(74) *Attorney, Agent, or Firm* — Canon U.S.A., Inc. IP Division

(57) ABSTRACT

An apparatus includes a setting unit configured to set an illumination condition used when an imaging unit captures an image of a target object illuminated with light emitted by an illumination unit, and a determination unit configured to determine, based on the set illumination condition, a derivation accuracy in reflection characteristic for each position on the target object.

15 Claims, 18 Drawing Sheets

FIG.2A
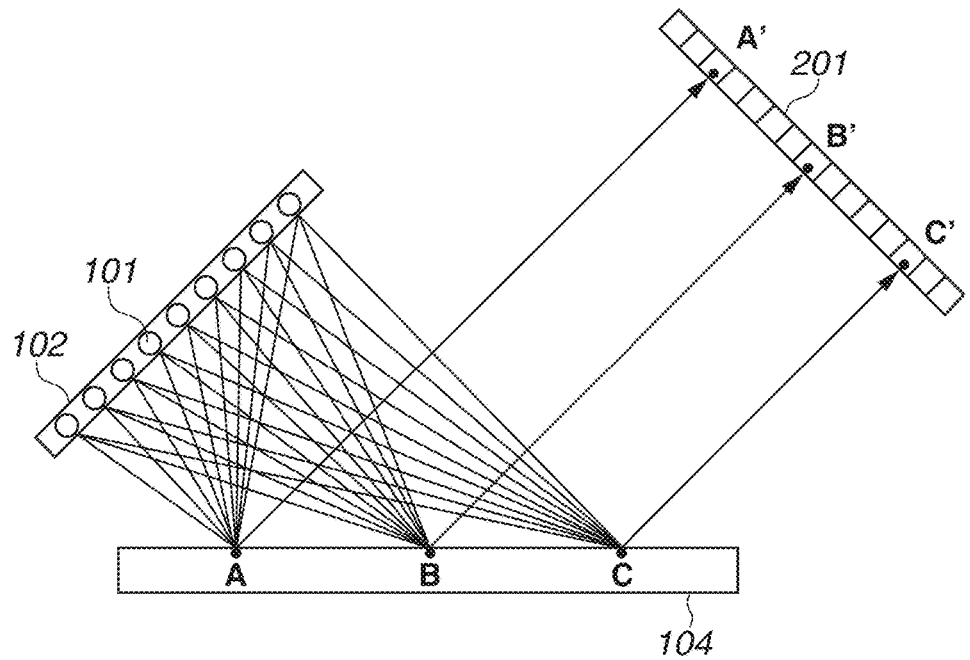
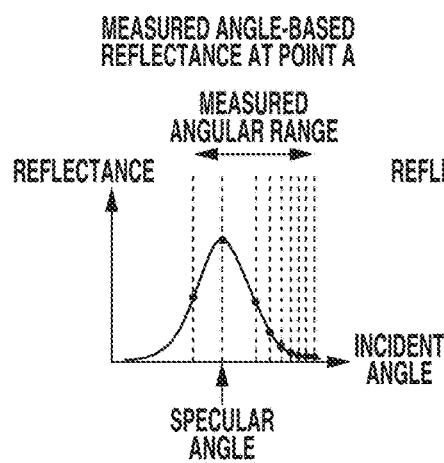
FIG.2B
MEASURED ANGLE-BASED REFLECTANCE AT POINT A
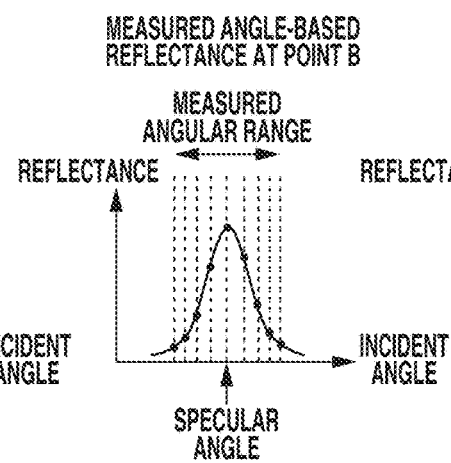
FIG.2C
MEASURED ANGLE-BASED REFLECTANCE AT POINT B
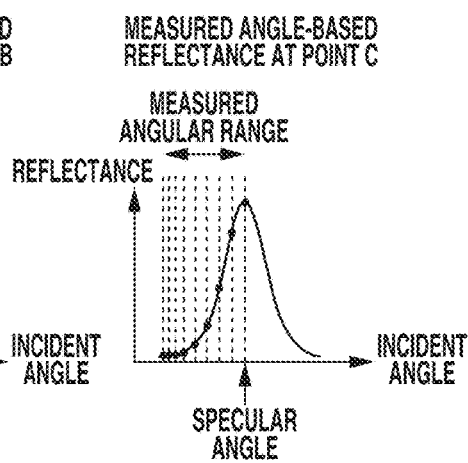
FIG.2D
MEASURED ANGLE-BASED REFLECTANCE AT POINT C

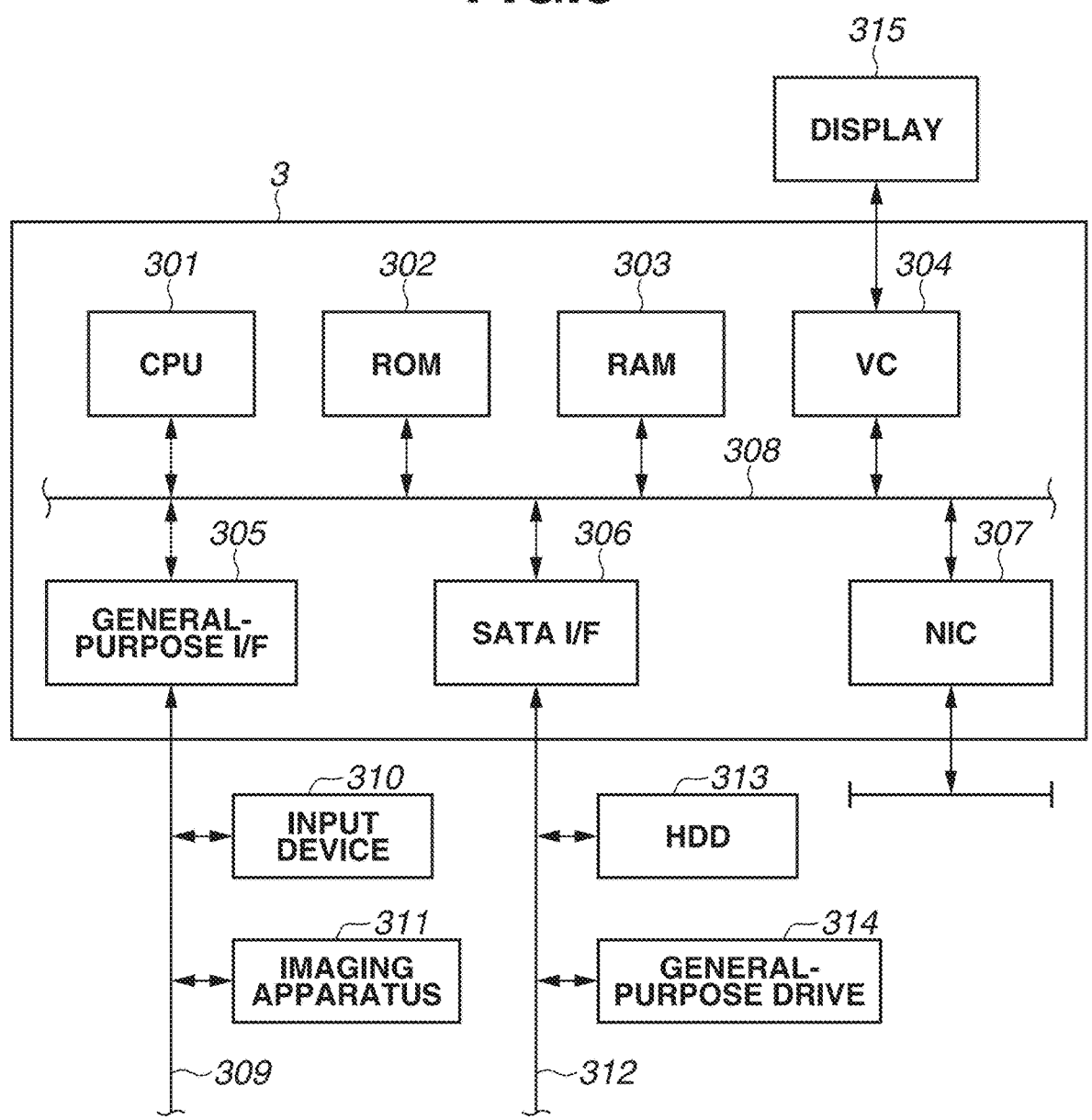

| 0 | 0 | 0 | 0 | 0 | 0 | 0 | 0 | 0 | 0 | 0 | 0 | 0 | 0 | 0 | 0 |
|---|---|---|---|---|---|---|---|---|---|---|---|---|---|---|---|
| 0 | 0 | 0 | 1 | 0 | 1 | 0 | 1 | 0 | 1 | 0 | 1 | 0 | 1 | 0 | 0 |
| 0 | 0 | 1 | 0 | 1 | 0 | 1 | 1 | 1 | 1 | 1 | 1 | 1 | 0 | 1 | 0 |
| 0 | 0 | 0 | 1 | 0 | 1 | 0 | 1 | 1 | 1 | 1 | 1 | 1 | 1 | 0 | 0 |
| 0 | 0 | 1 | 0 | 1 | 0 | 1 | 1 | 1 | 1 | 1 | 1 | 1 | 0 | 1 | 0 |
| 0 | 1 | 0 | 1 | 0 | 1 | 0 | 1 | 1 | 1 | 1 | 1 | 1 | 1 | 0 | 0 |
| 0 | 0 | 1 | 0 | 1 | 0 | 1 | 1 | 1 | 1 | 1 | 1 | 1 | 0 | 1 | 0 |
| 0 | 0 | 0 | 1 | 0 | 1 | 0 | 1 | 1 | 1 | 1 | 1 | 1 | 1 | 0 | 0 |
| 0 | 0 | 1 | 0 | 1 | 0 | 1 | 1 | 1 | 1 | 1 | 1 | 1 | 0 | 1 | 0 |
| 0 | 1 | 0 | 1 | 0 | 1 | 0 | 1 | 1 | 1 | 1 | 1 | 1 | 1 | 0 | 0 |
| 0 | 0 | 1 | 0 | 1 | 0 | 1 | 1 | 1 | 1 | 1 | 1 | 1 | 0 | 1 | 0 |
| 0 | 0 | 0 | 1 | 0 | 1 | 0 | 1 | 1 | 1 | 1 | 1 | 1 | 1 | 0 | 0 |
| 0 | 0 | 1 | 0 | 1 | 0 | 1 | 1 | 1 | 1 | 1 | 1 | 1 | 0 | 1 | 0 |
| 0 | 0 | 0 | 1 | 0 | 1 | 0 | 1 | 0 | 1 | 1 | 1 | 1 | 1 | 0 | 0 |
| 0 | 0 | 1 | 0 | 1 | 0 | 1 | 0 | 1 | 0 | 1 | 0 | 1 | 0 | 1 | 0 |
| 0 | 0 | 0 | 0 | 0 | 0 | 0 | 0 | 0 | 0 | 0 | 0 | 0 | 0 | 0 | 0 |

APPARATUS, METHOD, AND STORAGE MEDIUM

BACKGROUND

Field of the Disclosure

The aspect of the embodiments relates to an information processing technique for acquiring reflection characteristics of an object.

Description of the Related Art

There is a known technique for acquiring information representing the material of an object or the texture of paint. Specifically, in such a technique, first, an object is illuminated with light emitted from a light source, and the reflected light from the object is measured. Next, the reflection characteristic of each position on the object are acquired based on the direction in which the object is illuminated with the light and the direction in which the object is observed. Japanese Patent Application Laid-Open No. 2007-219715 discusses a technique for generating reflection characteristic data representing a distribution of reflection characteristics of an object by capturing, by an imaging apparatus, images of the object, illuminated with light from a light source.

When a distribution of reflection characteristic distribution of an object is derived as disclosed in Japanese Patent Application Laid-Open No. 2007-219715, different positions on an object could represent different reflection characteristic derivation accuracies. However, the technique according to Japanese Patent Application Laid-Open No. 2007-219715 cannot distinguish the reflection characteristic derivation accuracies on the individual positions on the object.

SUMMARY OF THE DISCLOSURE

According to an aspect of the embodiments, an apparatus includes a setting unit configured to set an illumination condition used when an imaging unit captures an image of a target object illuminated with light emitted by an illumination unit, and a determination unit configured to determine, based on the set illumination condition, a derivation accuracy in reflection characteristic for each position on the target object.

Further features of the disclosure will become apparent from the following description of exemplary embodiments with reference to the attached drawings.

BRIEF DESCRIPTION OF THE DRAWINGS

FIGS. 2A to 2D each illustrate a relationship between positions on a target object and corresponding measurement angles.

FIG. 3 is a block diagram illustrating an example of a hardware configuration of an information processing apparatus according to a first exemplary embodiment.

FIGS. 6A to 6C each illustrate an example of information about the positions of the light sources to be lit.

FIG. 18 illustrates an example of the positions of the light sources to be lit changed based on an SVBRDF derivation accuracy.

DESCRIPTION OF THE EMBODIMENTS

Figure 1:
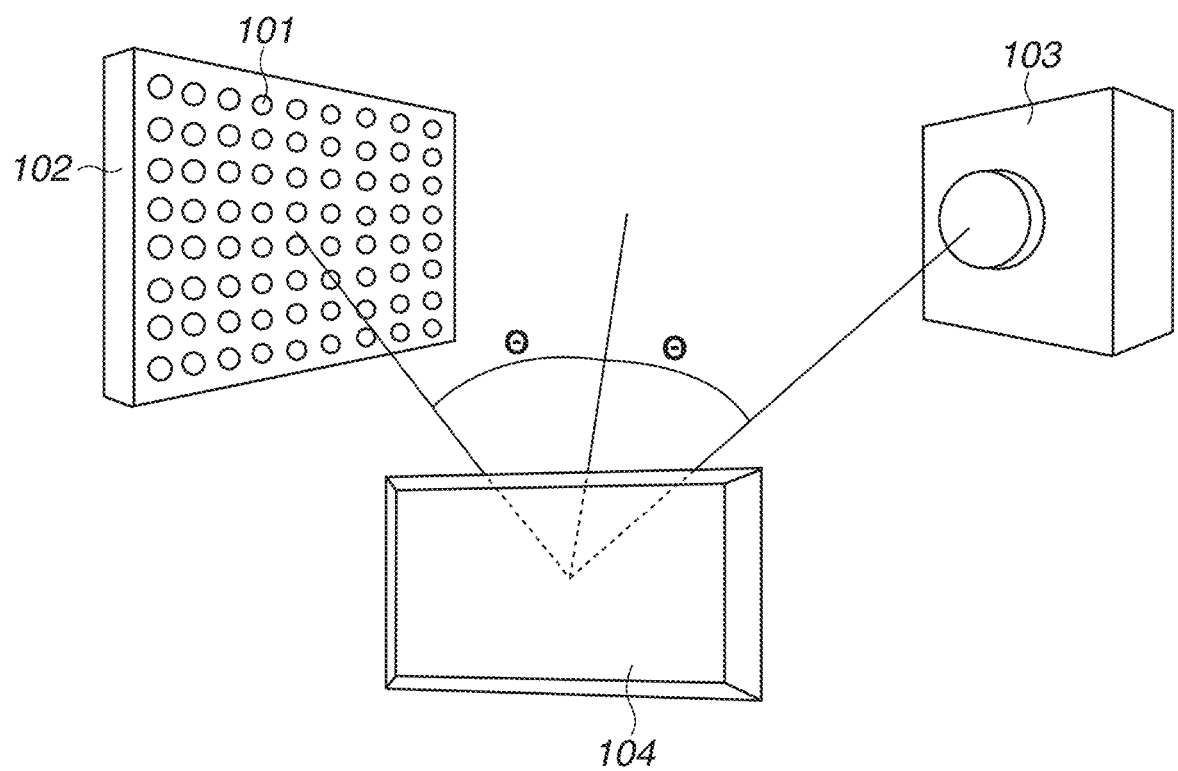
FIG. 1 illustrates an example of a configuration for measuring reflection characteristics.

Hereinafter, exemplary embodiments of the disclosure will be described with reference to the drawings. The following exemplary embodiments are not intended to limit the disclosure, and all the combinations of features described in the exemplary embodiments are not necessarily essential to realize the disclosure. The configurations described in the following exemplary embodiments are only examples, and therefore, the disclosure is not limited to the illustrated configurations. In addition, the following exemplary embodiments will be described by denoting the same components with the same reference numerals.

A general reflection characteristic measurement method roughly includes an imaging step of capturing a group of images and a reflection characteristic determination step of determining reflection characteristics based on the group of images. In the imaging step, a measurement target object, which is a sample to be measured and which will hereinafter be referred to as a target object, is illuminated with light from a light source of an illumination apparatus, and reflected light from the target object is captured by a two-dimensional (2D) imaging apparatus (hereinafter, referred to as an imaging apparatus). In the imaging step, a plurality of measurement conditions, each of which indicates a different relative positional relationship between the light source (illumination apparatus), the target object, and the imaging apparatus, are set. For example, in each measurement condition, the above components are arranged differently so that the target object is illuminated with light from the light source in a different direction and an image of the target object is captured by the imaging apparatus in a different direction. In the imaging step, a group of images of the target object is acquired for each of the different measurement conditions. In the reflection characteristic determination step, based on the group of images acquired in the imaging step, there is determined a spatially varying bidirectional reflectance distribution function (SVBRDF) (spatially 2D distribution characteristics of angle-based reflection characteristics), which is a bidirectional reflectance distribution function (BRDF) (angle-based reflection characteristics) for each position on a target object.

However, in this measurement method, to acquire the SVBRDF accurately, the light source and the imaging apparatus are to be arranged with a high angular resolution capability with respect to the target object. To arrange the light source and the imaging apparatus with a high angular resolution capability, since the distance between the light source and the target object and the distance between the target object and the imaging apparatus are to be extended, the size of the configuration is inevitably increased. In addition, to realize a high angular resolution capability, there are cases in which the light source and the imaging apparatus are made movable, and a relative positional relationship of these components with respect to the target object is made arbitrarily settable. In this case, the measurement is to be performed with the light source and the imaging apparatus moved to their respective set positions. In this case, time is needed to move and dispose the light source and the imaging apparatus to their arbitrary respective positions. Thus, it takes a long time to move and dispose the above components and finish the measurement. In addition, the measurement accuracy of the BRDF depends on the accuracy of this position control performed when the light source and the imaging apparatus are moved and disposed at their arbitrary respective positions. Thus, for example, if the accuracy of the position control is low, the measurement accuracy of the BRDF becomes also low.

In a first exemplary embodiment, an example configuration including an illumination apparatus 102 and an imaging apparatus 103 as illustrated in FIG. 1, will be described. This configuration enables acquisition of the SVBRDF with a high angular resolution capability and at high speed.

In the configuration in FIG. 1, the illumination apparatus 102 includes a plurality of light-emitting elements 101, which are diffused light sources and are disposed in a two-dimensional lattice (array). The illumination apparatus 102 is a light source apparatus capable of individually turning on and off the light-emitting elements 101. According to the present exemplary embodiment, on and off of the light-emitting elements 101 of the illumination apparatus 102 are controlled by an information processing apparatus 3, which will be described below with reference to FIGS. 3 and 4. While described in detail below, the information processing apparatus 3 is capable of turning on and off any one of the light-emitting elements 101 of the illumination apparatus 102 based on the illumination conditions set by a user.

A target object 104 is a target object whose reflection characteristics are to be measured.

The imaging apparatus 103 is a 2D imaging apparatus, such as a digital camera, which has a telecentric optical system. When light from a light source of the illumination apparatus 102 is reflected by the target object 104, the imaging apparatus 103 converts the reflected light into light parallel to its optical axis and captures an image of the target object 104.

In the configuration in FIG. 1, the illumination apparatus 102 sequentially turns on the light-emitting elements 101 and illuminates the target object 104 with the light from the corresponding light source. Of all the light reflected by the target object 104, the imaging apparatus 103 captures the light parallel to its main optical axis sequentially by using its telecentric optical system, so as to acquire a group of images. Next, the group of images is sent to the information processing apparatus 3 not illustrated in FIG. 1, and the information processing apparatus 3 derives a BRDF at each position on the target object based on the group of images and determines an SVBRDF.

The following description will be given of the range of the incident angle of the light emitted from each light source of the illumination apparatus 102 in FIG. 1 to each position on the target object 104, the difference in angular resolution capability, and the resulting impact on the BRDF derivation accuracy at each position on the target object with reference to FIGS. 2A to 2D.

FIG. 2A illustrates a positional relationship between the illumination apparatus 102, the target object 104, and an image sensor 201 in the imaging apparatus 103, seen from above the configuration in FIG. 1. Each white circle (○) in the illumination apparatus 102 represents a single light-emitting element 101. Each square in the image sensor 201 represents a single light-receiving element corresponding to a pixel. As described above, since the imaging apparatus 103 has a telecentric optical system, for example, light-receiving elements A' to C' of the image sensor 201 receive reflected light from the positions of points A to C of the target object 104 as parallel light.

Controlled by the information processing apparatus 3, the illumination apparatus 102 sequentially turns on the light-emitting elements 101 arranged in a two-dimensional lattice. Thus, the incident angles of the light emitted from a light source to each of the positions of the points A to C on the target object 104 are sequentially changed based on the lit position of this light-emitting element 101. Each of the light-emitting elements 101 emits light of a different incident angle, depending on its position. The light emitted from a light-emitting element 101 is reflected at the points A to C on the target object 104, and of all the reflected light, the light parallel to the main optical axis of the image sensor 201 is received by the light-receiving elements A' to C' of the image sensor 201. Similarly, also on positions other than the points A to C on the target object 104, the light emitted from a light source is incident at different incident angles, depending on the position of the light-emitting element 101. The reflected light is received by the corresponding light-receiving elements of the image sensor 201 as parallel light. In this way, with the configuration in FIG. 2A, since the imaging apparatus 103 performs imaging while the illumination apparatus 102 is sequentially turning on the light-emitting elements 101, the imaging apparatus 103 captures the reflected light of the light emitted from each light source, which has a different incident angle depending on the position on the target object 104.

FIG. 2B is a graph in which the horizontal axis represents the incident angle of the light emitted from each light source to the point A on the target object 104, and the vertical axis represents a value obtained by converting the amount of reflected light that the light-receiving element A' has received from the point A into a reflectance. An black circle plotted in the graph in FIG. 2B represents a value obtained by converting the amount of light received by the light-receiving element A' into a reflectance, and a curve connecting the black circles represents measured angle-based reflectances (BRDF). Similarly, FIG. 2C is a graph representing the incident angle of the light emitted from each light source to the point B on the target object 104 and a value obtained by converting the amount of reflected light that the light-receiving element B' has received into a reflectance.

FIG. 2D is a graph representing the incident angle of the light emitted from each light source to the point C on the target object 104 and a value obtained by converting the amount of reflected light that the light-receiving element C' has received into a reflectance.

As illustrated in the graph in FIG. 2C, it is seen that reflectances can be measured, including incident light incident from angles away from the specular angle, at the point B, which is near the center on the target object. In addition, it is seen from the graph in FIG. 2C that a high angular resolution capability can be obtained over the entire measurement angular range and that the BRDF is acquired accurately. On the other hand, as illustrated in the graph in FIG. 2B, at the point A on the target object close to the illumination apparatus 102, while the incident light incident from angles away from the specular angle is included, the BRDF is not sufficiently measured on one side. In addition, it is seen from the graph in FIG. 2B that the angular resolution capabilities near the specular angle are low and that the derivation accuracy in BRDF is low. In addition, as indicated by the graph in FIG. 2D, at the point C on the target object away from the illumination apparatus 102, while the angular resolution capabilities are high, the measurement angular range is narrow, and almost no angles on one side of the specular angle have been measured.

Thus, in the case of the configuration in FIG. 1, a different position on the target object represents a different reflection characteristic derivation accuracy. If a reflection characteristic derivation accuracy is different for each position on a target object, the SVBRDF can be determined accurately by appropriately controlling the positions of the light-emitting elements 101 of the illumination apparatus 102 to be lit. According to the present exemplary embodiment, the turning on position of each of the light-emitting elements of the illumination apparatus 102 can be set arbitrarily by the user via the information processing apparatus 3. In this case, the user is to appropriately set the turning on of the illumination apparatus 102 is to be set after recognizing which position on the target object results in a high or low reflection characteristic derivation accuracy. However, in the case of the configuration in FIG. 1, the user cannot grasp which position on the target object results in a high or low reflection characteristic derivation accuracy. Thus, the user cannot appropriately set the turning on position of the light-emitting element when the reflection characteristic of the target object are measured.

The information processing apparatus according to the present exemplary embodiment has a function of measuring the range of the incident angle of the light emitted from each light source to a position on a target object and the angular resolution capability, determining reflection characteristic derivation accuracy based on the measurement result, and presenting the derivation accuracy to the user. In this way, the user is able to recognize a reflection characteristic derivation accuracy for each position on a target object and set appropriate measurement conditions in the configuration in FIG. 1 before the reflection characteristic of the target object is derived.

FIG. 3 is a block diagram illustrating a hardware configuration example of the information processing apparatus 3 according to the present exemplary embodiment. The information processing apparatus 3 is capable of performing information processing for presenting a reflection characteristic derivation accuracy for each position on a target object to a user.

The information processing apparatus 3 includes a central processing unit (CPU) 301, a read-only memory (ROM) 302, a random access memory (RAM) 303, a video card (VC) 304, a general-purpose interface (I/F) 305, a serial advanced technology attachment (SATA) I/F 306, and a network interface card (NIC) 307.

The CPU 301 executes an operating system (OS) and various kinds of programs stored, for example, in the ROM 302 or a hard disk drive (HDD) 313 while using the RAM 303 as a work memory. In addition, the CPU 301 controls each of the components via a system bus 308. The processing of the following flowchart performed by the information processing apparatus 3 is implemented by the CPU 301 loading into the RAM 303 a program code according to the present exemplary embodiment stored, for example, in the ROM 302 or the HDD 313 and executing the program code.

The VC 304 is connected with a display 315. The general-purpose OF 305 is connected with an input device 310, such as a mouse and a keyboard, and an imaging apparatus 311 via a serial bus 309. The SATA OF 306 is connected with the HDD 313 or a general-purpose drive 314 used for reading and writing on various kinds of recording media via a serial bus 312. The NIC 307 is used to exchange information with an external apparatus. The CPU 301 uses the HDD 313 or various kinds of recording media mounted on the general-purpose drive 314 as storage positions of various kinds of data. The CPU 301 displays a graphical user interface (GUI) provided by a program on the display 315 and receives input information such as user instructions via the input device 310.

<Functional Configuration of Information Processing Apparatus>

Figure 4:
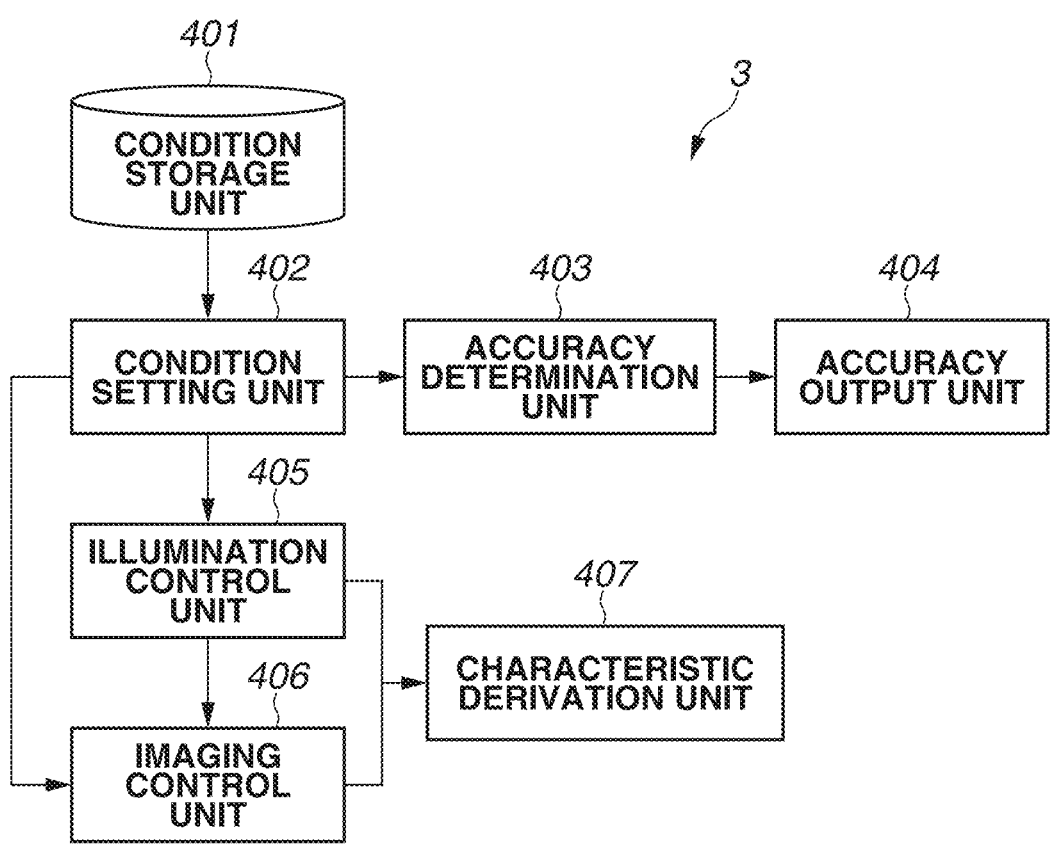
FIG. 4 is a block diagram illustrating a functional configuration of the information processing apparatus according to the first exemplary embodiment.

FIG. 4 is a block diagram illustrating a functional configuration of the information processing apparatus 3 according to the present exemplary embodiment. The CPU 301 in FIG. 3 implement the processing of the individual functional unit illustrated in FIG. 4 by reading and executing a program according to the present exemplary embodiment stored in the ROM 302 or the HDD 313 while using the RAM 303 as a work memory. The CPU 301 does not need to perform all the processing of the following functional units. The information processing apparatus 3 may be configured so that one or a plurality of processing circuits other than the CPU 301 perform part or all of the processing.

The information processing apparatus 3 includes a condition storage unit 401, a condition setting unit 402, an accuracy determination unit 403, an accuracy output unit 404, an illumination control unit 405, an imaging control unit 406, and a characteristic derivation unit 407 as functional units. The information processing apparatus 3 determines an SVBRDF derivation accuracy under the illumination conditions when reflection characteristics of a target object are acquired with the configuration in FIG. 1. After the information processing apparatus 3 presents the derivation accuracy to the user, the user sets conditions (illumination conditions and imaging conditions). Based on these conditions, the information processing apparatus 3 controls the illumination apparatus 102 to illuminate the target object 104 with light and the imaging apparatus 103 to capture images of the target object 104. Next, the information processing apparatus 3 derives an SVBRDF based on the group of images acquired by the imaging apparatus 103 under the illumination conditions and the imaging conditions set by the user.

Figure 5:
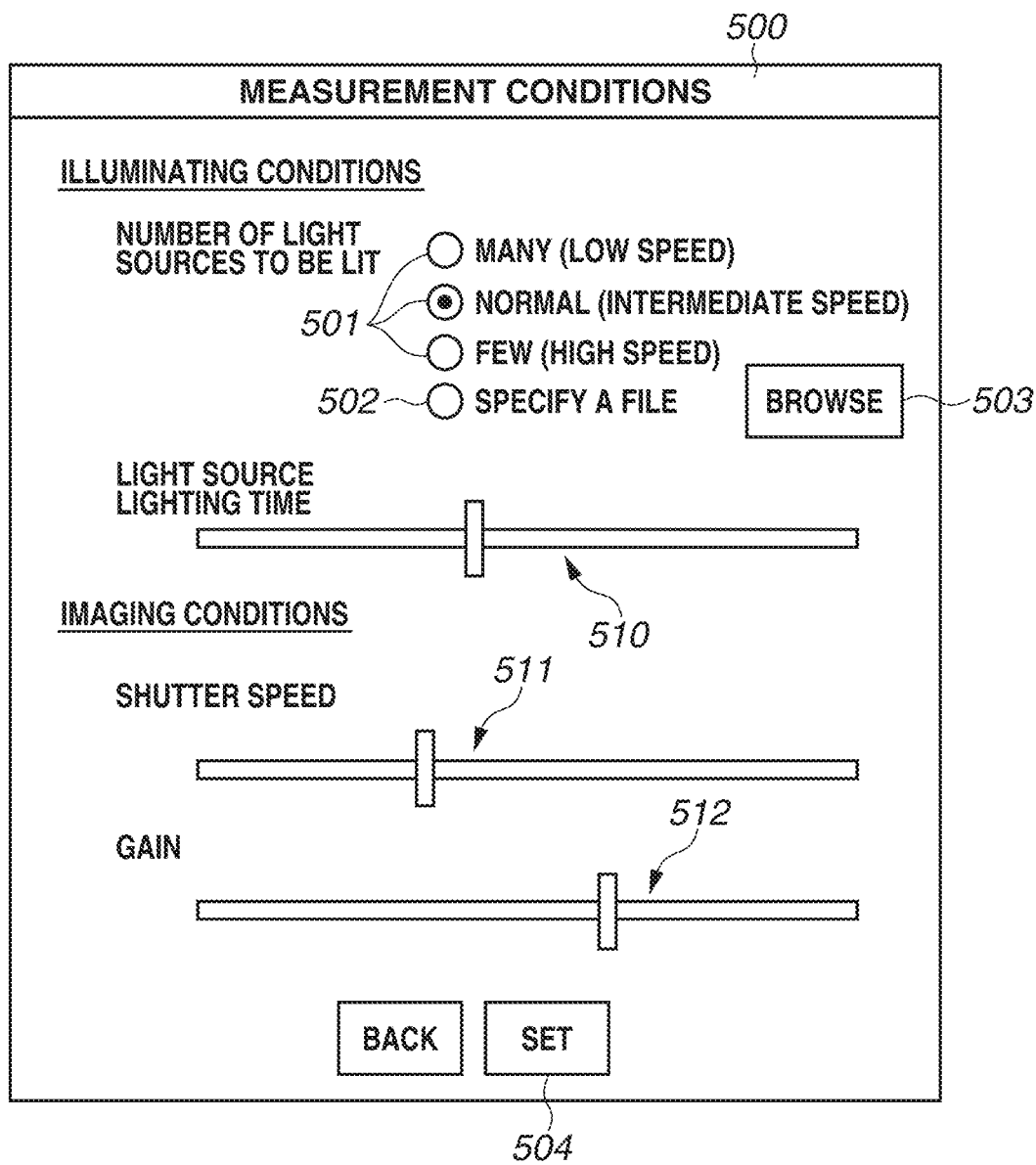
FIG. 5 illustrates an example of a graphical user interface (GUI) for setting measurement conditions according to the first exemplary embodiment.

FIG. 5 illustrates an example of a GUI 500 for setting measurement conditions. This GUI 500 is used when the user sets illumination conditions and imaging conditions. The GUI 500 is generated by the CPU 301 of the information processing apparatus 3 and is displayed on the display 315 in FIG. 3 via the VC 304.

The GUI 500 includes radio buttons 501 (option buttons) as items for setting the illumination conditions of the illumination apparatus 102. The user can set the number of light sources (light-emitting elements 101) to be lit by selecting "many", "normal", or "few". These "many", "normal", and "few" as the number of light sources to be lit correspond to the reflection characteristic measurement time, i.e., the speed of the measurement processing. For example, when the number of light sources to be lit is low, since the measurement time is shortened, the processing is performed at high speed. In contrast, when the number of light sources to be lit is high, since the measurement time is extended, the processing is performed at low speed. When the number of light sources to be lit is normal (about an intermediate number), since an intermediate measurement time is also needed, the processing is performed at an intermediate speed. The user operates the input device 310 to specify any one of the radio buttons 501. In this way, the user can select one of the options "many", "normal", and "few". After the user selects one of the options and presses a set button 504, the condition setting unit 402 sets the number of light sources to be lit of the illumination apparatus 102 based on the selected option and sets which light sources are to be lit based on the number of light sources to be lit.

As illustrated in FIG. 5, the GUI 500 includes a slider and slide bar 510 for specifying a light source lighting time, which is information about the measurement time, as an item for setting illumination conditions other than the number of light sources to be lit. The light source lighting time is associated with the number of light sources to be lit, and the condition setting unit 402 determines the number of light sources to be lit, based on the specified light source lighting time. For example, when a short light source lighting time is specified, the condition setting unit 402 sets a small number of light sources to be lit. When a long light source lighting time is specified, the condition setting unit 402 sets a large number of light sources to be lit. When an intermediate light source lighting time is specified, the condition setting unit 402 sets an intermediate number of light sources to be lit. The user can move the slider by operating the input device 310 and can specify a light source lighting time (information about the measurement time) by further pressing the set button 504. The condition setting unit 402 sets the number of light sources to be lit, based on the light source lighting time (information about the measurement time) that the user has specified by moving the slider.

In addition, the GUI 500 includes, as items for setting the imaging conditions of the imaging apparatus 103, a slider and slide bar 511 for setting a shutter speed and a slider and a slide bar 512 for setting a gain. The user can move the sliders by operating the input device 310 and specify these conditions by pressing the set button 504.

Figures 6A, 6B, 6C:
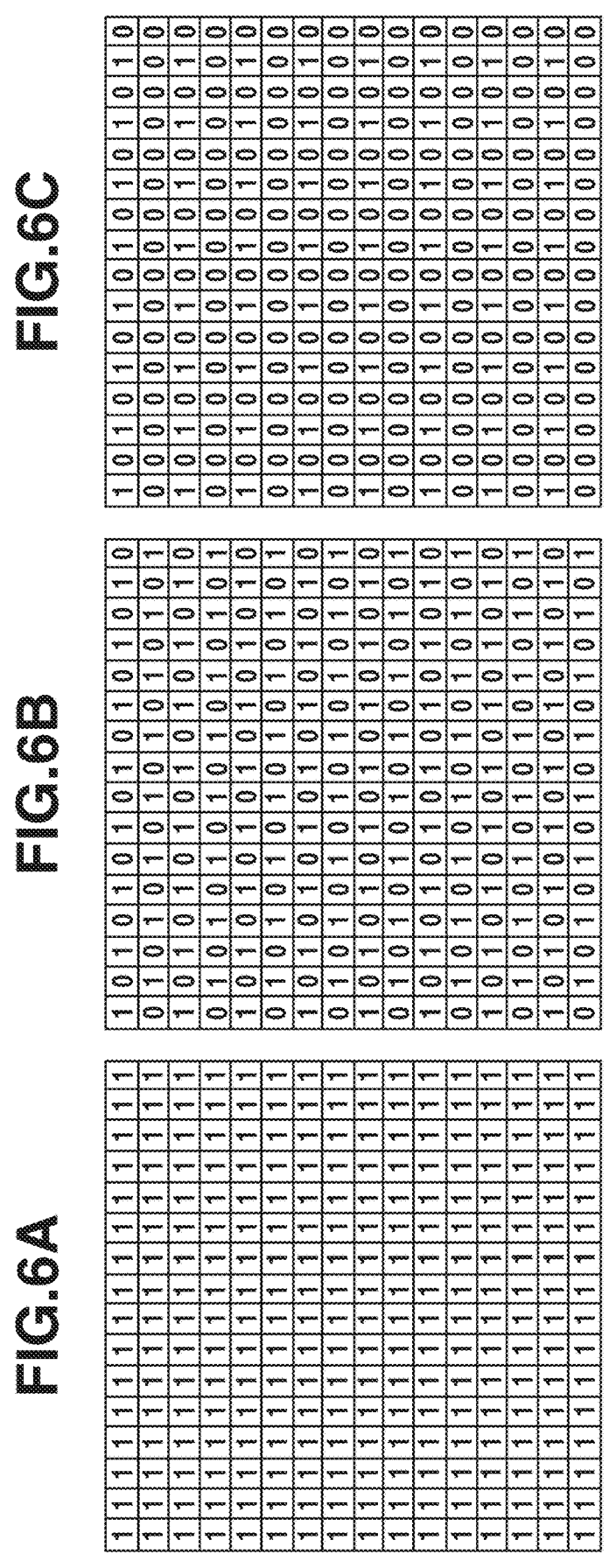

The condition storage unit 401 holds information about the above-described illumination conditions and imaging conditions. FIGS. 6A to 6C illustrate examples of the information about the light sources to be lit. These examples correspond to the options "many", "normal", and "few" of the above-described illumination condition regarding the number of light sources to be lit. FIG. 6A illustrates an example in which a large number of light sources are lit. FIG. 6B illustrates an example in which a normal number of light sources (about half of the light sources) are lit. FIG. 6C illustrates an example in which a small number of light sources are lit. Each lattice in the two-dimensional lattices illustrated in FIGS. 6A to 6C represents a single light-emitting element (light source) on the illumination apparatus 102. A lattice including "1" as lighting information about the corresponding light source represents "on" of this light source, and a lattice including "0" as lighting information about the corresponding light source represents "off" of this light source. In other words, the lighting information "1" indicates that the corresponding light source is lit, and the lighting information "0" indicates that the corresponding light source is not lit. These items of lighting information (information about whether the light sources are lit) may be stored in the condition storage unit 401 as information represented by an N x N matrix or information represented by a one-dimensional list.

In addition, the number of light sources to be lit, including the information about lighting positions of light sources, may be selected by specifying a file. For example, the GUI 500 in FIG. 5 includes a radio button 502 indicating "specify a file". When the user specifies this radio button 502 and presses a browse button 503, the information processing apparatus 3 presents, to the user on a screen, a plurality of referable files stored in the condition storage unit 401. For example, the CPU 301 of the information processing apparatus 3 generates information about the screen indicating the plurality of referable files, etc. For example, the condition storage unit 401 previously holds files indicating on and off of the light sources as "1" and "0" and having the same format as that of FIGS. 6A to 6C. When the browse button 503 is pressed, the CPU 301 generates a screen indicating a list of files stored in the condition storage unit 401 and presents this screen, to the user, on the GUI 500 or a different window so that the user can refer to the files. Next, when the user specifies a file in the file list, the condition setting unit 402 reads this specified file from the condition storage unit 401 and sets in the illumination apparatus 102 the number of light sources to be lit (sets the information about the positions of light sources to be lit) written in this file.

The condition storage unit 401 may hold, other than the information about the positions of light sources to be lit, the information about the illumination conditions of the light source lighting time and the information about imaging conditions of the shutter speed and the gain. The light source lighting time is stored in association with the number of light sources to be lit. When the user specifies a light source lighting time, the condition setting unit 402 acquires the number of light sources to be lit (the information about the positions of light sources to be lit) based on the light source lighting time. In addition, for example, when the user specifies a shutter speed and a gain, in response to this instruction, the condition setting unit 402 sets the shutter speed and the gain of the imaging apparatus 103.

The accuracy determination unit 403 acquires the illumination conditions set by the condition setting unit 402 (in the present exemplary embodiment, the illumination conditions of the positions of light sources to be lit, based on the number of light sources to be lit) and determines the SVBRDF derivation accuracy based on the positions of light sources to be lit.

Figure 7:
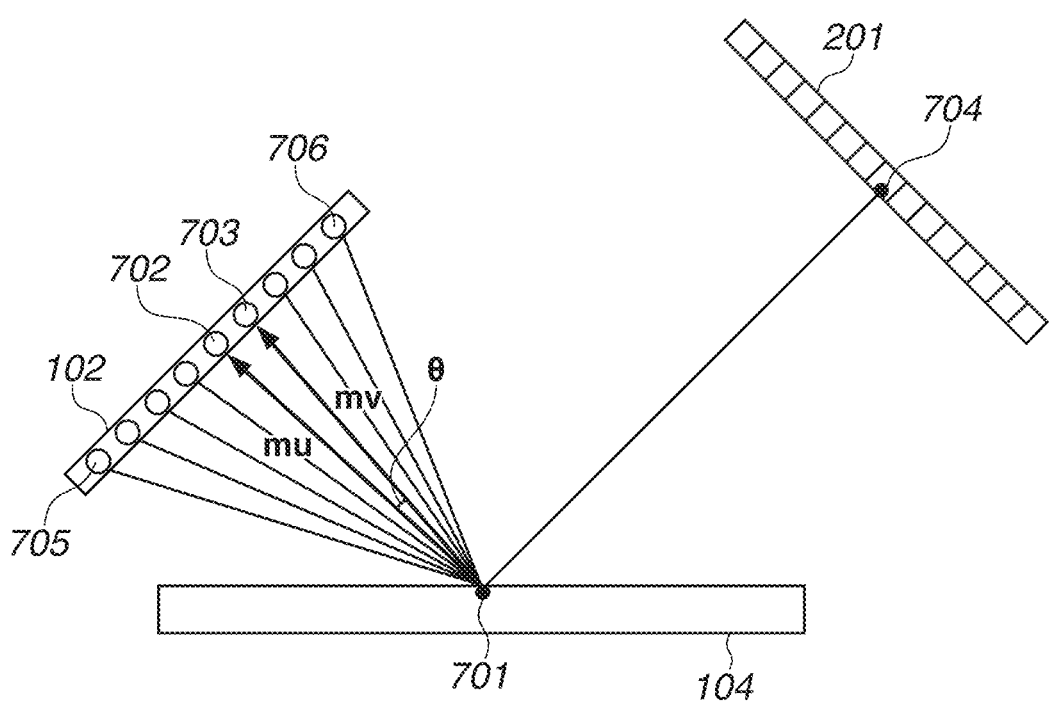
FIG. 7 is a diagram illustrating a method for determining reflection characteristic derivation accuracies.

A method for determining an SVBRDF derivation accuracy by the accuracy determination unit 403 will be described with reference to FIG. 7. As in the above FIG. 2A, FIG. 7 illustrates a positional relationship between the illumination apparatus 102, the target object 104, and the image sensor 201 in the imaging apparatus 103, seen from above the configuration in FIG. 1.

In the following description, assume that the relative positional relationship (distances and angles) illustrated in FIG. 7 between the illumination apparatus 102, the imaging apparatus 103 (image sensor 201), and the target object 104 is known. In addition, as described above, the light reflected by the target object 104 is converted into parallel light by the telecentric optical system of the imaging apparatus 103 and received by the image sensor 201. Thus, a position 701 on the target object 104 can be determined from a position 704 (pixel position) of a light-receiving element on the image sensor 201. In addition, of all the plurality of light sources (light-emitting elements) of the illumination apparatus 102, a position 702 of a light source L1 can be determined from the position of the light-emitting element of the light source L1 of the illumination apparatus 102. In addition, a position 703 of a light source L2 neighboring the light source L1 can be determined from the position of the light-emitting element of the light source L2 of the illumination apparatus 102.

In the following description, assume that the xyz coordinates of the position 701 on the target object 104 are represented by $(x_s, y_s, z_s)$ and that the xyz coordinates of the position 702 of the light source L1 are represented by $(x_{L1}, y_{L1}, z_{L1})$. In addition, in the following description, assume that the xyz coordinates of the position 703 of the light source L2 are represented by $(x_{L2}, y_{L2}, z_{L2})$. In addition, assume that the vector from the position 701 on the target object 104 to the light source L1 (position 702) is represented by mu and that the vector from the position 701 to the light source L2 (position 703) is represented by my, the vector mu and the vector my are expressed by the following formula (1). In addition, an angle θ, which is the angle formed by the vector mu and the vector my, is determined from the following formula (2).

$$mu = (x_{L1} - x_s, y_{L1} - y_s, z_{L1} - z_s)$$

$$mv = (x_{L2} - x_s, y_{L2} - y_s, z_{L2} - z_s) \quad (1)$$

$$\theta = \arccos((mu \cdot my)/(|mu| \cdot |mv|)) \quad (2)$$

Figure 8A:
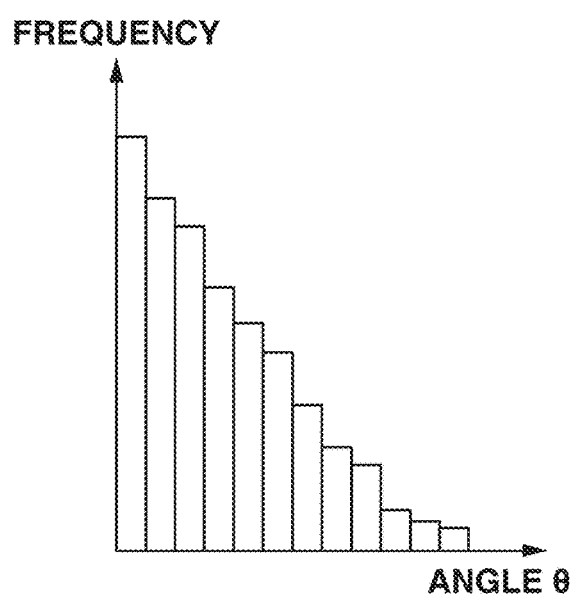
FIGS. 8A and 8B each illustrate a histogram of angles formed by light sources (light-emitting elements).

In this way, the accuracy determination unit 403 determines the angle θ, which is an angle formed by the two light sources at the positions 702 and 703 neighboring each other on the illumination apparatus 102 with respect to the position 701 on the target object 104. Further, in the same way, the accuracy determination unit 403 determines an angle θ, which is an angle formed by two light sources neighboring each other in a direction orthogonal to the arrangement direction of the two light sources at the positions 702 and 703 on the illumination apparatus 102 with respect to the position 701 on the target object 104. In the same way, the accuracy determination unit 403 determines angles θ for all of the light sources on the illumination apparatus 102 for each of the positions on the target object 104, each position corresponding to a pixel (light-receiving element) of the image sensor 201. Next, the accuracy determination unit 403 calculates a histogram of these angles θ. FIG. 8A is a histogram of angles θ determined for each of the positions on the target object 104, each position corresponding to a pixel of the image sensor 201.

Figure 8B:
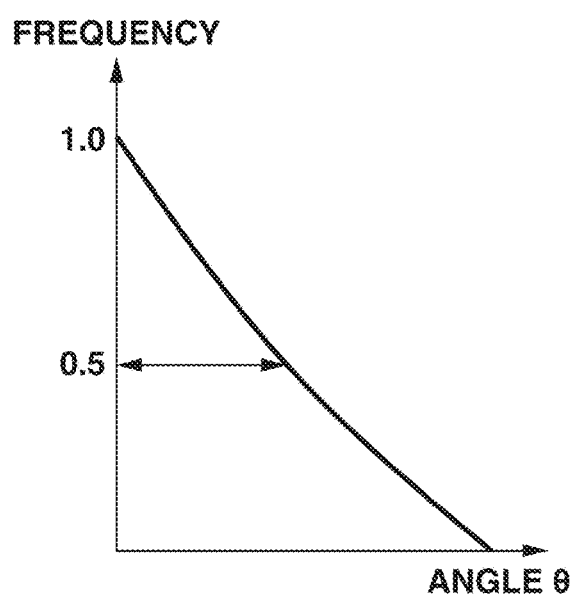

Further, the accuracy determination unit 403 calculates an index indicating the level of the accuracy in angular resolution capability based on the histogram of angles θ. This index can be calculated from a frequency corresponding to a preset angle or less in the histogram. The index is not limited thereto. For example, as illustrated in FIG. 8B, a graph may be obtained by approximating the histogram to a function, and the width of a predetermined frequency (herein, 50% of the maximum frequency) on the graph may be used. More simply, the minimum value of the angle θ may be used for the index. As described above, the accuracy determination unit 403 calculates an index indicating the level of the accuracy in angular resolution capability for each of positions on the target object 104, each position corresponding to a pixel of the image sensor 201.

Further, the accuracy determination unit 403 calculates not only the above-described angular resolution capability but also an index indicating the angular range of each pixel on the image sensor 201. For example, the accuracy determination unit 403 obtains an angle θ formed by two light sources, such as the light sources at positions 705 and 706 of the illumination apparatus 102, separated farthest from each other in the illumination apparatus 102 with respect to the position 701 on the target object 104, in the similar way as described above. Next, the accuracy determination unit 403 uses the obtained angle θ as an index indicating the angular range. Alternatively, the accuracy determination unit 403 may obtain the maximum value in the histogram of angles θ illustrated in FIG. 8A as the index indicating the angular range.

Then, the accuracy determination unit 403 determines an SVBRDF derivation accuracy at each position on the target object 104 by using the index indicating the angular resolution capability and the index indicating the angular range determined as described above.

Figure 9A:
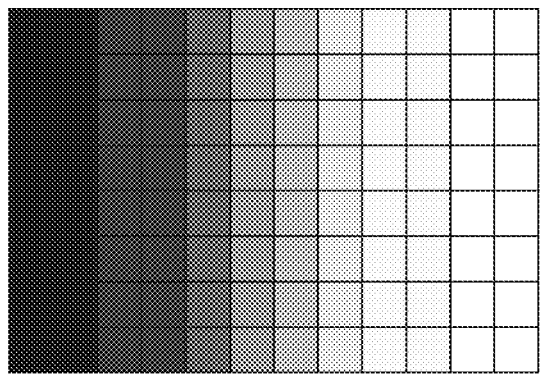
FIG. 9A illustrates an angular resolution capability map.
Figure 9B:
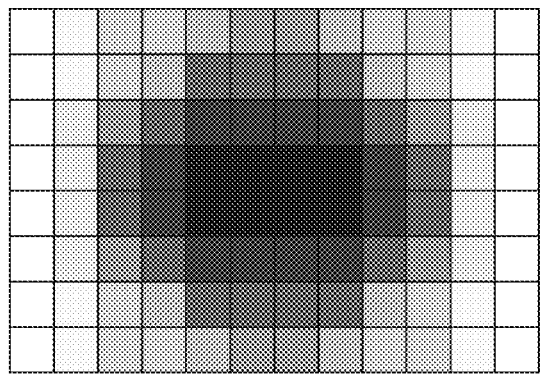
FIG. 9B illustrates an angular range map.

FIG. 9A illustrates an example of an angular resolution capability map, and FIG. 9B illustrates an example of an angular range map. A single square (box) in FIGS. 9A and 9B corresponds to a single pixel (light-receiving element) of the image sensor 201. Since each pixel (light-receiving element) of the image sensor 201 corresponds to a position on the target object 104, FIGS. 9A and 9B correspond to an angular resolution capability map and an angular range map at each position on the target object 104. In FIG. 9A, a grayer square represents a higher angular resolution capability. In FIG. 9B, a grayer square represents a wider angular range.

Figure 10:
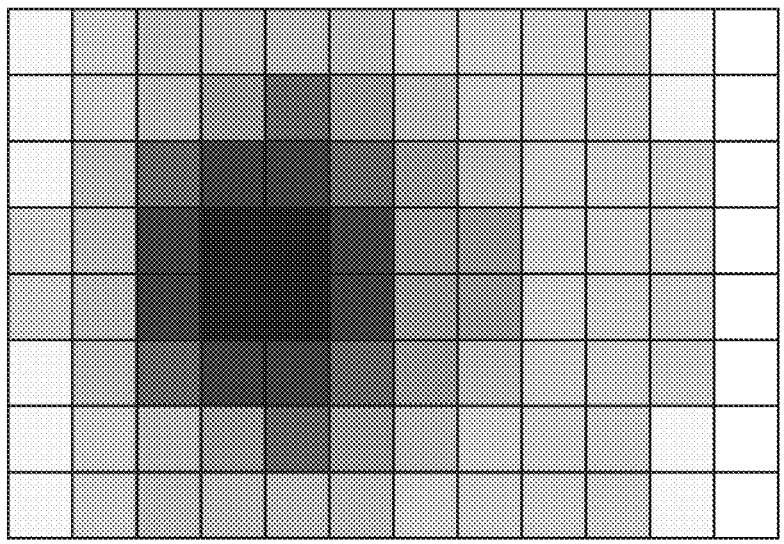
FIG. 10 illustrates an example of a spatially varying bidirectional reflectance distribution function (SVBRDF) derivation accuracy map.

The accuracy determination unit 403 determines a SVBRDF derivation accuracy map as illustrated in FIG. 10, based on the angular resolution capability map in FIG. 9A and the angular range map in FIG. 9B. In FIG. 10, a grayer square represents a higher SVBRDF derivation accuracy. For example, the accuracy determination unit 403 determines an SVBRDF derivation accuracy by multiplying an index indicating an angular resolution capability by an index indicating an angular range. Alternatively, for example, the accuracy determination unit 403 may determine an SVBRDF derivation accuracy by calculating a linear sum of an index indicating an angular resolution capability and an index indicating an angular range. Still alternatively, for example, the accuracy determination unit 403 may determine an SVBRDF derivation accuracy by performing weighted average calculation in which predetermined weights are added to an index indicating an angular resolution capability and an index indicating an angular range. Information about the SVBRDF derivation accuracy determined by the accuracy determination unit 403 in this way is sent to the accuracy output unit 404.

The accuracy output unit 404 outputs the information about the SVBRDF derivation accuracy determined by the accuracy determination unit 403. Then, based on the information about the SVBRDF derivation accuracy, the CPU 301 generates, for example, a preview image for displaying the SVBRDF derivation accuracy and displays the preview image on the GUI 500 in FIG. 5 or a different window. In this way, the user can check the SVBRDF derivation accuracy. In addition, after checking the SVBRDF derivation accuracy, the user can determine the number of light sources to be lit, in consideration of the SVBRDF derivation accuracy and the measurement time corresponding to the number of light sources to be lit. Herein, while the preview image is an image representing the SVBRDF derivation accuracy map illustrated in FIG. 10, an image, for example, representing the angular resolution capability map in FIG. 9A and the angular range map in FIG. 9B may be used as the preview image representing the SVBRDF derivation accuracy.

The illumination control unit 405 sequentially turns on the light sources with lighting information indicating "1" among the light-emitting elements 101 of the illumination apparatus 102, based on the information about the positions of light sources to be lit determined by the condition setting unit 402.

The imaging control unit 406 causes the imaging apparatus 103 to sequentially perform imaging based on the timing at which the illumination control unit 405 sequentially turns on the light sources of the illumination apparatus 102 based on the positions of light sources to be lit determined by the condition setting unit 402. In this case, the illumination control unit 405 sends synchronization signals for sequentially turning on the light-emitting elements 101 to the imaging control unit 406, and the imaging control unit 406 controls the imaging timings by using the synchronization signals from the illumination control unit 405 as triggers. In this way, imaging, in which the timings at which the light sources are sequentially lit in the illumination apparatus 102 and the imaging timings of the imaging apparatus 103 are synchronized, is performed.

The characteristic derivation unit 407 derives an SVBRDF based on a group of images captured by the imaging apparatus 103.

Figure 11:
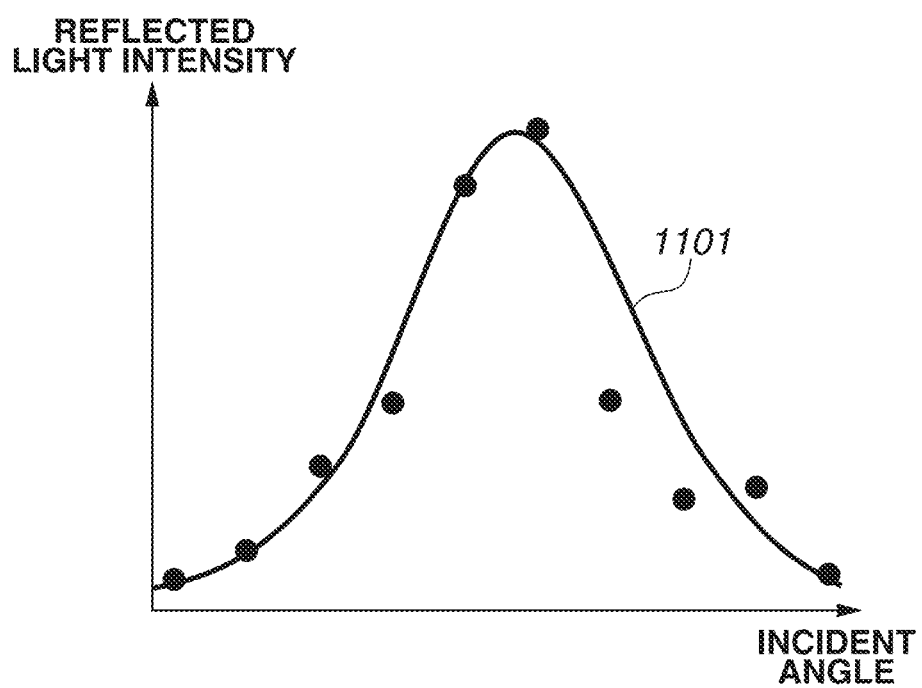
FIG. 11 is a graph illustrating an example of a bidirectional reflectance distribution function (BRDF) at a certain position on the target object.

FIG. 11 is a graph illustrating a relationship between the incident angles of the light from the light sources emitted to a position of interest on the target object 104 and the pixel values (points plotted in the graph) of a light-receiving element (pixel) on the image sensor 201 corresponding to the position of interest, and an SVBRDF 1101 derived. To derive the SVBRDF, a known reflection model, such as a Phong model or a Torrance-Sparrow model, may be used. Alternatively, Gaussian function approximation or polynomial approximation may be used, for example. A model formula or a function coefficient is determined by using a known optimization method, such as a least-square method.

Hereinafter, processing performed by the information processing apparatus 3 according to the present exemplary embodiment will be described with reference to flowcharts in FIGS. 12 and 13.

Figure 12:
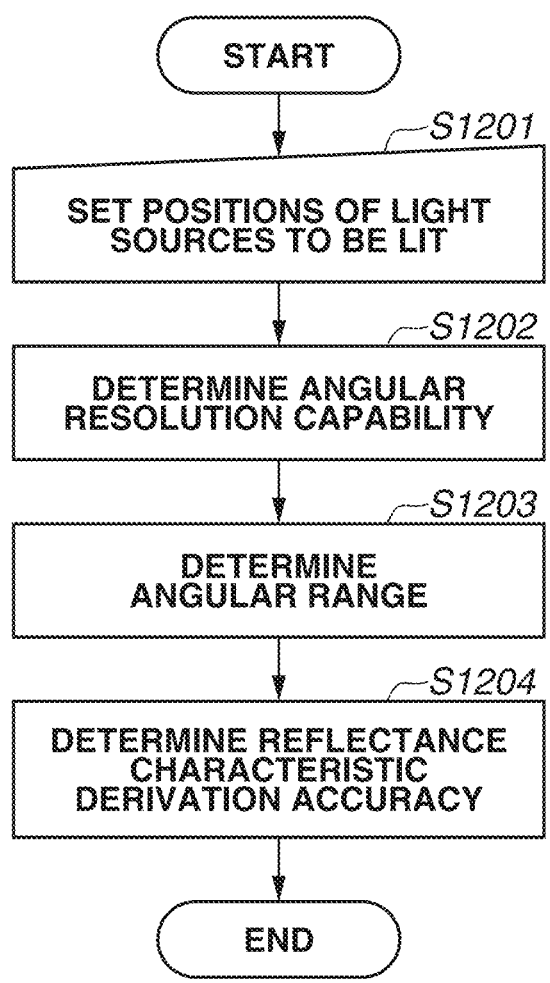
FIG. 12 is a flowchart illustrating processing for determining reflection characteristic derivation accuracies.

FIG. 12 is a flowchart illustrating a processing flow by the information processing apparatus 3 performing setting the positions of light sources to be lit and determining reflection characteristic derivation accuracies.

First, in step S1201, the condition setting unit 402 sets the positions of light sources to be lit based on a user instruction about the number of light sources to be lit. In the present exemplary embodiment, when the user selects the number of light sources to be lit from the options about the number of light sources to be lit previously set as illustrated on the GUI 500 in FIG. 5, the condition setting unit 402 sets the positions of light sources to be lit based on the selected number of light sources to be lit. Then, the accuracy determination unit 403 acquires information about the positions of light sources to be lit, corresponding to the number of light sources to be lit, set by the condition setting unit 402.

Next, in step S1202, the accuracy determination unit 403 determines an index indicating an angular resolution capability as described above based on the information about the positions of light sources to be lit.

Next, in step S1203, the accuracy determination unit 403 determines an index indicating an angular range as described above from the information about the positions of light sources to be lit.

Next, in step S1204, the accuracy determination unit 403 determines an SVBRDF derivation accuracy based on the index indicating the angular resolution capability determined in step S1202 and the index indicating the angular range determined in step S1203.

Figure 13:
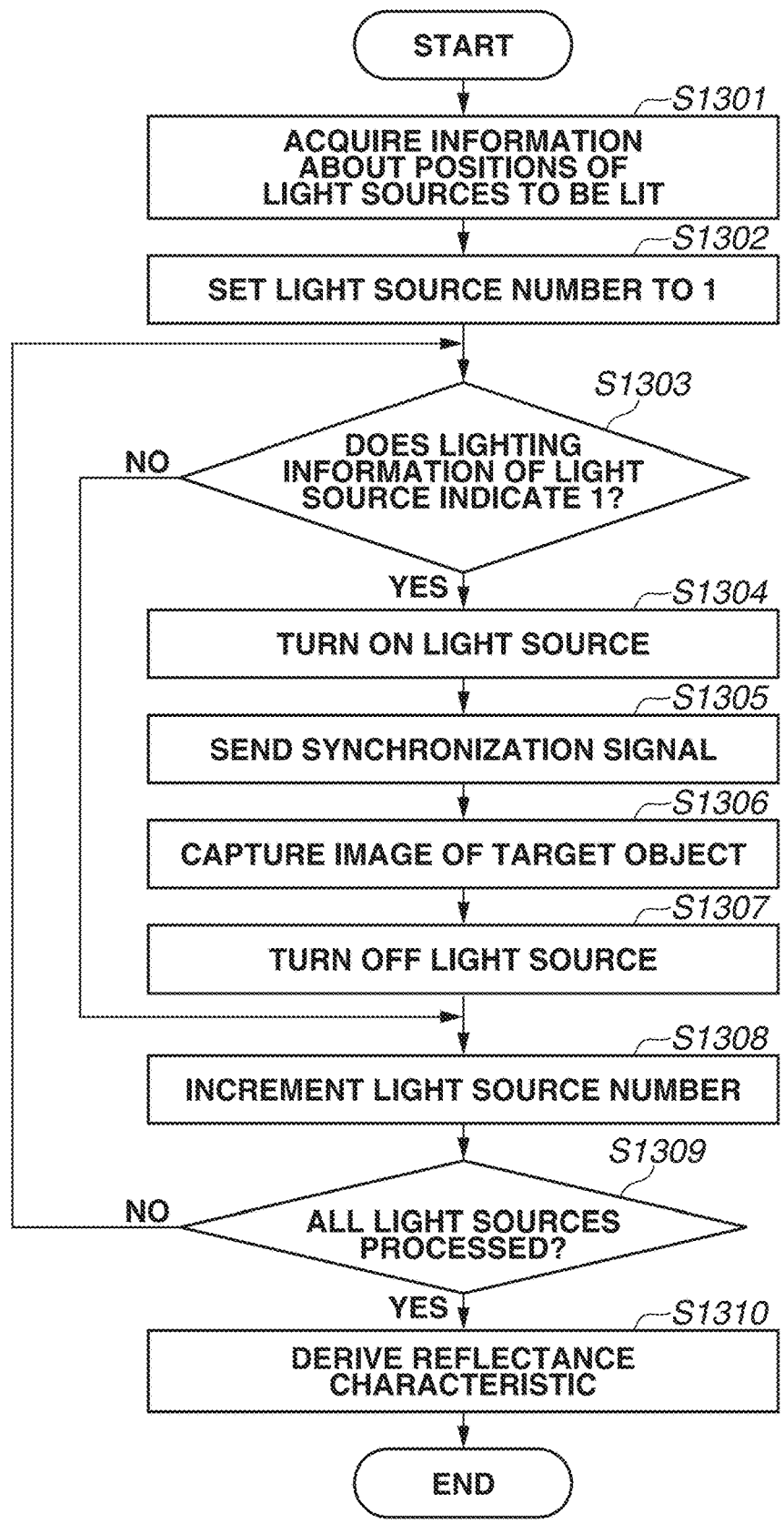
FIG. 13 is a flowchart illustrating reflection characteristic derivation processing based on conditions set by a user.

FIG. 13 is a flowchart illustrating a processing flow by the information processing apparatus 3 controlling the illumination apparatus 102 and the imaging apparatus 103 to capture the target object 104 and deriving an SVBRDF based on the measurement conditions (illumination condition and imaging condition) specified by the user.

First, in step S1301, the illumination control unit 405 acquires the illumination condition (information about the positions of light sources to be lit) set by the condition setting unit 402 based on a user instruction. In this step, the imaging control unit 406 acquires the imaging conditions (information about a shutter speed and a gain) set by the condition setting unit 402 based on a user instruction.

Next, in step S1302, the illumination control unit 405 sets the light source number, on which on or off is to be determined, to an initial value 1. In the present exemplary embodiment, consecutive light source numbers, for example, from 1 to the number of light-emitting elements 101 in an ascending order, are allocated to the light-emitting elements 101 of the illumination apparatus 102. In step S1302, the illumination control unit 405 sets the light source number, on which on or off is determined, to 1.

Next, in step S1303, the illumination control unit 405 determines whether the lighting information of the light source (light-emitting element) whose light source number is 1 indicates "1 (on)".

If the illumination control unit 405 determines that the lighting information indicates "1 (on)" (YES in step S1303), the processing proceeds to step S1304. In step S1304, the illumination control unit 405 turns on the light source (light-emitting element) whose light source number is 1. Next, in step S1305, the illumination control unit 405 sends a synchronization signal to the imaging control unit 406, corresponding to the light source control in step S1304. On the other hand, in step S1303, if the illumination control unit 405 determines that the lighting information indicates "0 (off)" (NO in step S1303), the processing proceeds to step S1308.

Next, in step S1306, the imaging control unit 406 captures an image of the target object 104 at a timing at which the imaging control unit 406 receives the synchronization signal from the illumination control unit 405. In this way, in the present exemplary embodiment, based on the information about the positions of light sources to be lit, the illumination control unit 405 sequentially turns on these light sources of the illumination apparatus 102, and the imaging control unit 406 and performs imaging in synchronization with the sequential on of the light sources.

Next, in step S1307, the illumination control unit 405 turns off the light source lit in step S1304.

Next, in step S1308, the illumination control unit 405 increments the light source number.

Next, in step 1309, the illumination control unit 405 determines whether all the light sources of the illumination apparatus 102, to the light source having the last light source number, have been processed in step S1303 and the subsequent steps thereof. If there is a light source not processed yet (NO in step S1309), the processing returns to step S1303. On the other hand, in step S1309, if the illumination control unit 405 determines that all the light sources have been processed (YES in step S1309), the processing proceeds to step S1310.

In step S1310, the characteristic derivation unit 407 derives an SVBRDF by using a group of images obtained by the imaging processing of the imaging apparatus 103 through repetition of the processing in steps S1303 to S1309.

As described above, according to the first exemplary embodiment, since the user can check the reflection characteristic derivation accuracy for each position on the target object prior to the measurement, the user can appropriately set the measurement conditions (illumination condition and imaging condition) based on the measurement time and the reflection characteristic derivation accuracy.

Next, as a second exemplary embodiment, an example in which an SVBRDF derivation accuracy is determined based on not only the angular resolution capability and angular range described in the first exemplary embodiment but also gloss characteristic of a target object. As in FIG. 1, the configuration according to the second exemplary embodiment also includes the illumination apparatus 102 and the imaging apparatus 103. The illumination apparatus 102 illuminates the target object 104 with light from light sources while sequentially changing the positions of light sources to be lit, and the imaging apparatus 103 captures image of the target object 104. In addition, since the hardware configuration of the information processing apparatus 3 according to the second exemplary embodiment is the same as that according to the first exemplary embodiment, the illustration and description of the hardware configuration will be omitted. Hereinafter, the differences between the first and second exemplary embodiments will be mainly described. The components according to the second exemplary embodiment that are the same as those according to the first exemplary embodiment will be descried with the same reference numerals added.

Figure 14:
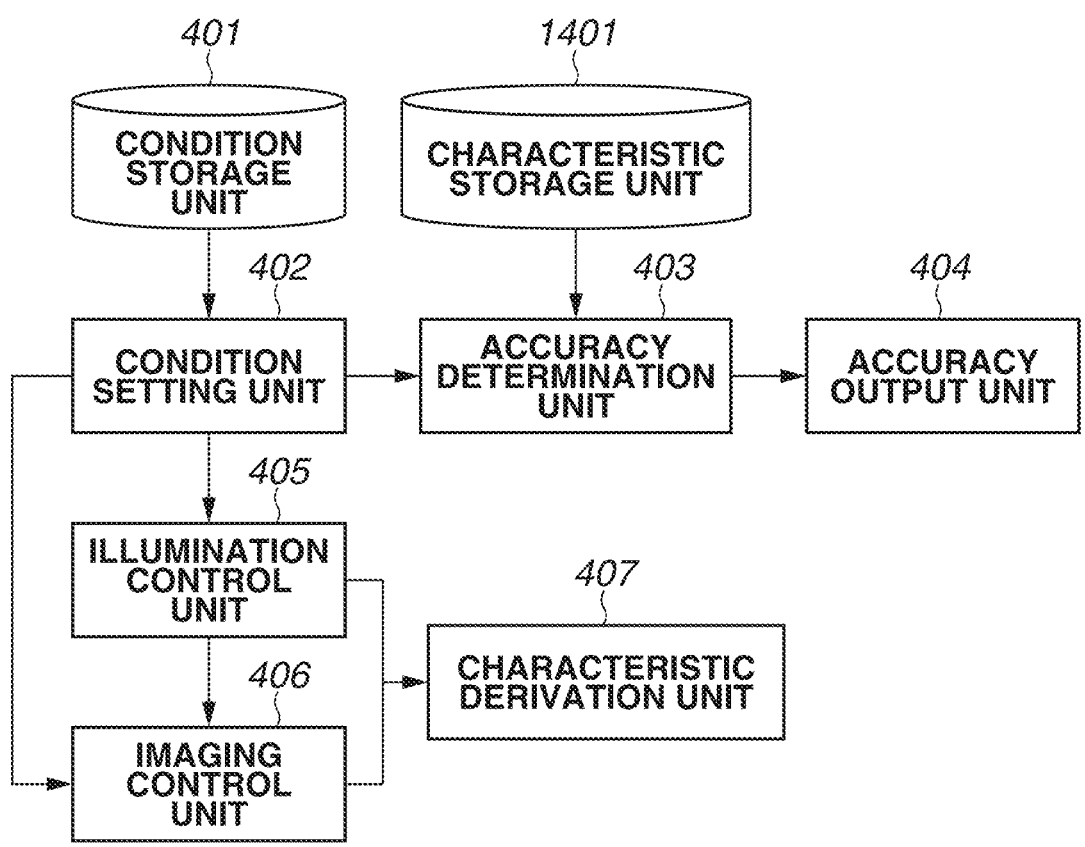
FIG. 14 is a block diagram illustrating a functional configuration of an information processing apparatus according to a second exemplary embodiment.

FIG. 14 is a block diagram illustrating a functional configuration of the information processing apparatus 3 according to the second exemplary embodiment.

The information processing apparatus 3 according to the second exemplary embodiment includes a characteristic storage unit 1401 in addition to the functional configuration in FIG. 4 according to the first exemplary embodiment. The characteristic storage unit 1401 holds information about gloss characteristic of a target object (sample) to be measured. The information processing apparatus 3 according to the second exemplary embodiment determines an SVBRDF derivation accuracy by using information about the gloss characteristic stored in the characteristic storage unit 1401, in addition to an index indicating an angular resolution capability and an index indicating an angular range described in the first exemplary embodiment. In addition, as described above, the information processing apparatus 3 controls the illumination apparatus 102 and the imaging apparatus 103 under the conditions specified by the user based on the SVBRDF derivation accuracy. Then, the information processing apparatus 3 derives an SVBRDF, based on a group of images obtained by illuminating and imaging the target object 104.

In the second exemplary embodiment, information about the gloss characteristic of the target object is used in addition to the information about the angular resolution capability and the angular range described in the first exemplary embodiment. In the present exemplary embodiment, the information about the gloss characteristic is information about the spread of the reflected light near a reflection peak angle of angle-based reflection characteristic. For example, the information about the gloss characteristic is determined based on a spatially 2D distribution of angle-based reflection characteristic of the target object derived by the characteristic derivation unit 407.

Figure 15:
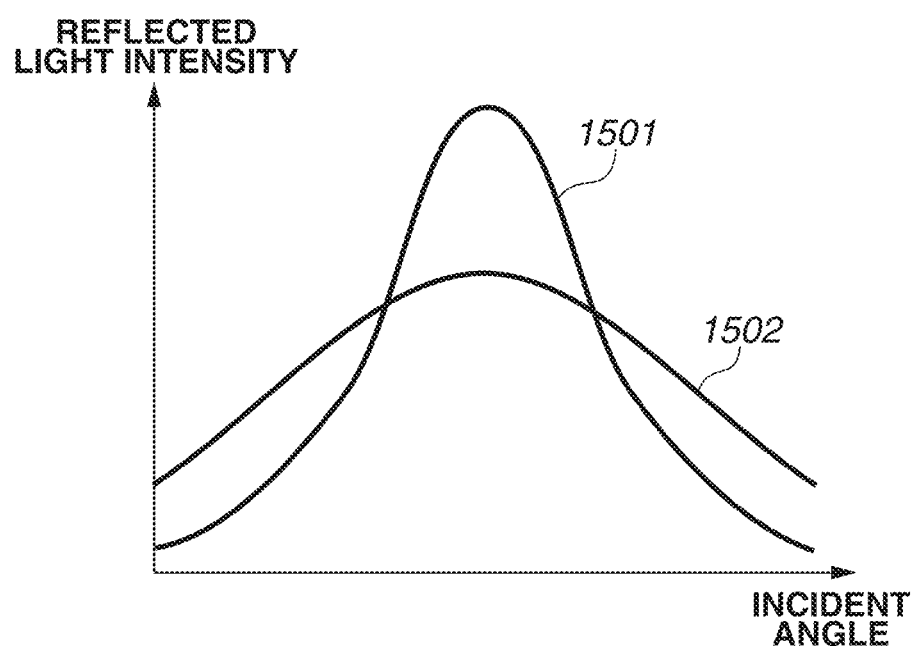
FIG. 15 is a graph illustrating a reflected light intensity with respect to each incident angle on a glossy object.

FIG. 15 is a graph illustrating a relationship between the angle of incident light on an object and the reflected light intensity. More specifically, a graph 1501 in FIG. 15 represents a BRDF of an object (glossy object) having high gloss characteristic, and a graph 1502 represents a BRDF of an object (low glossy object) having low gloss characteristic.

In the case of a glossy object having a sharp BRDF as indicated by the graph 1501 (object having a high image clarity), if the angular resolution capability is low near the reflection peak, the number of data required to determine the shape of the BRDF is insufficient, and thus, the BRDF derivation accuracy is low. On the other hand, in the case of a low glossy object having a BRDF in which the reflected light intensity changes less with respect to the incident angle as indicated by the graph 1502 (object having a low image clarity), it is often the case that the number of data required to determine the shape of the BRDF is sufficient, even if the angular resolution capability near the reflection peak is low. Further, regarding the angular range also, in the case of a glossy object, if the change near the reflection peak is not sufficiently acquired, the BRDF derivation accuracy is low. In the case of a low glossy object, even if the angular range acquired near the reflection peak is narrow, the BRDF derivation accuracy is high. As described above, the SVBRDF derivation accuracy is affected not only by the resolution capability of the incident angle of the light emitted from each light source to the target object 104 and the angular range but also by the gloss characteristic of the target object 104. In particular, how sharp the BRDF is (image clarity level) greatly affects the derivation accuracy.

Thus, when the user sets the gloss characteristic of the target object 104 in the information processing apparatus 3 according to the second exemplary embodiment, the accuracy determination unit 403 acquires information about the set gloss characteristic from the characteristic storage unit 1401. Next, the accuracy determination unit 403 determines a SVBRDF derivation accuracy by using the information about the gloss characteristic, in addition to an index indicating the angular resolution capability and an index indicating the angular range described in the above first exemplary embodiment.

Figure 16:
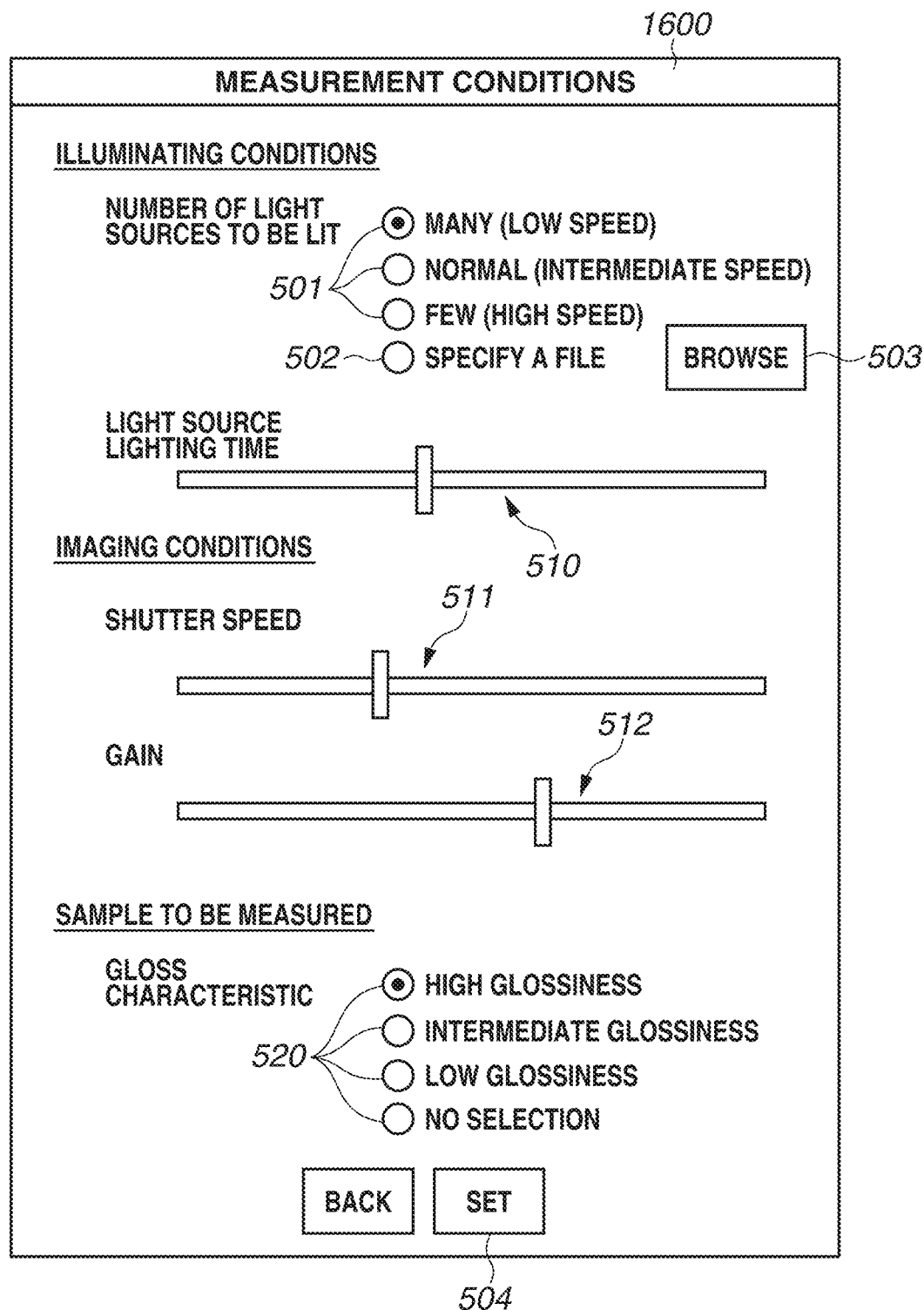
FIG. 16 illustrates an example of a GUI for setting measurement conditions according to the second exemplary embodiment.

FIG. 16 illustrates an example of a GUI 1600 on which the user can specify the gloss characteristic according to the second exemplary embodiment in addition to illumination conditions and imaging conditions as in the example in FIG. 5. The GUI 1600 is generated by the CPU 301 and displayed on a screen of the display 315 in FIG. 3.

The GUI 1600 illustrated in FIG. 16 includes radio buttons 520 (options) as items for allowing the user to specify gloss characteristic. The radio buttons 520 correspond to "high glossiness", "intermediate glossiness", "low glossiness", and "NO SELECTION". By specifying one of the radio buttons 520 with the input device 310, the user can select one of the options "high glossiness", "intermediate glossiness", "low glossiness", or "NO SELECTION". When one of the options is selected by the user, the accuracy determination unit 403 acquires the information about the gloss characteristic based on the selected option from the characteristic storage unit 1401.

Then, the accuracy determination unit 403 calculates an SVBRDF derivation accuracy by multiplying a weight coefficient by an index indicating an angular resolution capability and an index indicating an angular range calculated in the same way as in the first exemplary embodiment. In this case, a lower weight coefficient is used for higher gloss characteristic.

Figure 17A:
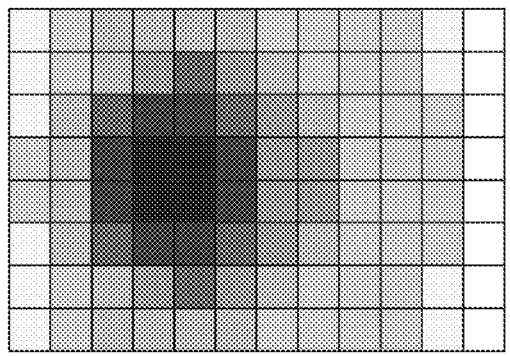
FIGS. 17A and 17B illustrate examples of SVBRDF derivation accuracies of objects having different gloss characteristics.
Figure 17B:
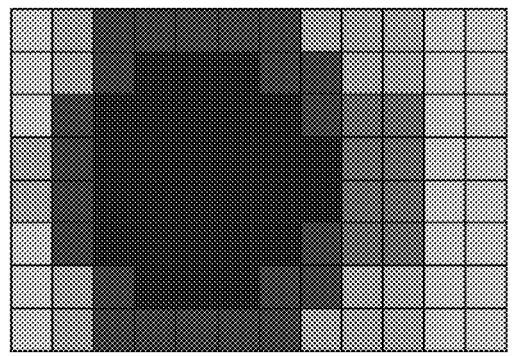

FIGS. 17A and 17B illustrate examples of maps of SVBRDF derivation accuracies determined by the accuracy determination unit 403. These maps are obtained when the same light sources are lit and target objects having different gloss characteristics are used. FIG. 17A illustrates a derivation accuracy map when the target object is a glossy object, FIG. 17B illustrates a derivation accuracy map when the target object is a low glossy object. In these derivation accuracy maps, a grayer square represents a higher SVBRDF derivation accuracy. From FIGS. 17A and 17B, it is found that the target object having higher gloss characteristic results in a lower SVBRDF derivation accuracy.

While the GUI 1600 in FIG. 16 includes an item indicating gloss characteristic "NO SELECTION", this is because the user does not always need to select gloss characteristic when the user checks the accuracy after the measurement. When the user specifies "NO SELECTION", the accuracy determination unit 403 determines the gloss characteristic from the SVBRDF derived by the characteristic derivation unit 407 and determines an SVBRDF derivation accuracy by using this information.

As described above, the information processing apparatus 3 according to the second exemplary embodiment can determine a reflection characteristic derivation accuracy for each position on a target object in consideration of the gloss characteristic of the target object. For example, when the user selects low glossiness as the gloss characteristic of the target object, since the number of light sources to be lit is reduced, the measurement time can be shortened. In addition, according to the present exemplary embodiment, without selecting the gloss characteristic of the target object, the user can check a reflection characteristic derivation accuracy after the measurement and check the reliability of the measurement result.

<Variation>

As a variation of the above exemplary embodiments, an example in which the positions of light sources to be lit are changed based on the SVBRDF derivation accuracies as illustrated in FIGS. 10 and 17 will be described. Hereinafter, a method for determining the positions of light sources to be lit will be described. This method acquires similar SVBRDF derivation accuracies regardless of the position on the target object 104 and will be described by using the derivation accuracy in FIG. 10 as an example. The user specifies the ratio regarding the number of light sources to be lit, and the condition setting unit 402 performs weighting to reduce the unevenness in the derivation accuracy in FIG. 10. In the weighting, the closer a region with a high derivation accuracy is to a region corresponding to specular reflection, the higher the probability that the number of light sources to be lit represents 0. In this way, the condition setting unit 402 determines the positions of light sources to be lit. FIG. 18 illustrates an example of the positions of light sources to be lit determined by this method. The two-dimensional lattice illustrated in FIG. 18 and the information written in each square are the same as the examples in FIGS. 6A to 6C.

As another example, of all the processing of the functional units according to the above-described exemplary embodiments, the processing of the accuracy determination unit 403, the characteristic derivation unit 407, and other units may be performed by using a learned model obtained by machine learning. In this case, for example, a plurality of combinations of input data and output data are prepared as learning data for the functional units, and knowledge is acquired by machine learning from these combinations. Then, a learned model that outputs the output data with respect to the input data as a result based on the acquired knowledge, is generated. For example, the learned model can be configured by a neural network model. The learned model performs the processing of the above functional units by operating with a CPU or GPU, as a program that performs the same processing as that of the above functional units. The learned model may be updated after certain processing as needed.

According to the exemplary embodiments of the disclosure, the reflection characteristic derivation accuracy on each position on a target object can be distinguished.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)TM), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-161942, filed Sep. 28, 2020, which is hereby incorporated by reference herein in its entirety.

What is claimed is:
1. An apparatus comprising:
at least one processor; and
a memory coupled to the at least one processor, the memory having instructions that, when executed by the at least one processor, performs operations as:

an acquisition unit configured to acquire information about an angle of light incident on a target object and information about a gloss characteristic of the target object; and a determination unit configured to determine, based on the acquired information, a derivation accuracy in reflection characteristic for each position on the target object.

2. The apparatus according to claim 1, wherein the determination unit performs weighting on the information about the angle of the incident light, based on the information about the gloss characteristic of the target object.

3. The apparatus according to claim 2, wherein a lower weight is applied to the information about the angle of the incident light as the gloss characteristic of the target object are higher.

4. The apparatus according to claim 1, wherein the information about the gloss characteristic is information about spread of reflected light near a reflection peak angle of the reflection characteristic.

5. The apparatus according to claim 1, wherein the information about the gloss characteristic is determined based on a spatial two-dimensional distribution of angle-based reflection characteristic of the target object.

6. The apparatus according to claim 1, wherein the determination unit determines the derivation accuracy by using information about the gloss characteristic based on an instruction from a user.

7. The apparatus according to claim 1, wherein the information about the angle includes an angular range and an angular resolution capability is determined based on a relative positional relationship between an illumination unit and the target object and positions of a plurality of light-emitting elements to be lit, the light-emitting elements being included in the illumination unit.

8. The apparatus according to claim 7, wherein the determination unit determines the derivation accuracy by multiplying an index indicating the angular range by an index indicating the angular resolution capability.

9. The apparatus according to claim 7, wherein the determination unit determines the derivation accuracy based on a linear sum of an index indicating the angular range and an index indicating the angular resolution capability.

10. The apparatus according to claim 7, wherein the determination unit determines the derivation accuracy based on a weighted average obtained by performing predetermined weighting on an index indicating the angular range and an index indicating the angular resolution capability.

11. The apparatus according to claim 7, wherein the determination unit acquires the angular resolution capability from a histogram of angles formed by two lit light-emitting elements of the illumination unit for each position on the target object.

12. The apparatus according to claim 1, wherein the at least one processor further permorns operations as a presenting unit configured to present the derivation accuracy to a user.

13. The apparatus according to claim 1, wherein the at least one processor further performs operations as a derivation unit configured to derive, in synchronization with a timing at which positions of a plurality of light-emitting elements to be lit, the light-emitting elements being included in an illumination unit, are changed, a spatial two-dimensional distribution of reflection characteristic for each position on the target object, based on an image captured by can imaging unit.

14. A method comprising:

acquiring information about an angle of light incident on a target object and information about a gloss characteristic of the target object and determining, based on the acquired information, a derivation accuracy in reflection characteristic for each position on the target object.

15. A non-transitory computer-readable storage medium storing instructions that, when executed by a computer, cause the computer to perform a method, the method comprising:

acquiring information about an angle of light incident on a target object and information about a gloss characteristic of the target object; and determining, based on the acquired information, a derivation accuracy in reflection characteristic for each position on the target object.

* * * * *